United States Patent [19]

Payne

[11] 3,908,508
[45] Sept. 30, 1975

[54] STRAIN INDICATOR

[75] Inventor: William J. Payne, Greensburg, Pa.

[73] Assignee: Modulus Corporation, Cleveland, Ohio

[22] Filed: Sept. 23, 1974

[21] Appl. No.: 508,211

[52] U.S. Cl. .................................. 85/62; 73/88 F
[51] Int. Cl.² ...................................... G01D 21/00
[58] Field of Search ............... 85/62, 61, 1 T, 32 T; 73/88 F, 88 E, 88 A, 1 B; 116/DIG. 34

[56] References Cited
UNITED STATES PATENTS

| | | | |
|---|---|---|---|
| 2,747,454 | 5/1956 | Bowersett | 85/62 |
| 3,179,082 | 4/1965 | McClean | 85/62 |
| 3,589,234 | 6/1971 | Trigg | 85/62 |
| 3,602,186 | 8/1971 | Popenoe | 85/62 |
| 3,776,031 | 12/1973 | Trigg | 85/62 |
| 3,799,108 | 3/1974 | Mosow | 85/62 |
| 3,812,758 | 5/1974 | Bossler | 85/62 |
| 3,823,639 | 7/1974 | Liber | 85/62 |
| 3,850,133 | 11/1974 | Johnson | 85/62 |

Primary Examiner—Marion Parsons, Jr.
Attorney, Agent, or Firm—Fay & Sharpe

[57] ABSTRACT

A strain indicator of the type wherein a change in length of a strain member produces movement of an indicator member. Such movement, in the elastic range of the fastener material, is essentially linear and in proportion to the stress being applied to the fastener. When, however, a preset strain limit within the fastener is exceeded the indicator element is biased in an upward direction giving an immediate visual indication of that fact.

5 Claims, 4 Drawing Figures

STRAIN INDICATOR

BACKGROUND OF THE INVENTION

This invention relates to strain indicators and more particularly to strain indicators of the type wherein a change in length of a strain member produces movement of an indicator member.

In many assembly operations where fastening devices are used it is desirable to inspect the assembled fastener to determine that it has been taken up an appropriate amount. The fastener may be, for example, a stud, a bolt, a rivet or the like.

Several prior art techniques have been utilized for determining when a fastener has been properly taken up. One such technique involves the use of a torque wrench in which a specified number of foot pounds may be verified as having been applied to a fastener in the assembly thereof. Other prior art techniques have made use of the fact that take-up of a fastener will set up certain stress levels in the fastener which may be measured as, for instance, by means of stress sensitive materials. Still further prior art techniques have made use of the fact that take-up of a fastener produces an elongation of the fastener which may be measured utilizing well known techniques such as direct measuring devices.

The above examples demonstrate that fastener take-up may be measured by determining either torque, stress or strain values in a fastener.

Since torque, stress and strain are all interrelated, it is possible to determine the stress levels in a fastener knowing the strain of the fastener. Similarly, it is possible to determine torque values knowing the stress imparted to the fastener at any point. Thus, for purposes of illustration, the terms torque, stress and strain may be used interchangeably. The device of this invention is termed a strain indicator because the elongation of the fastener is being sensed in order to determine a take-up condition of the fastener. The term strain indicator should not be considered as limiting since in its broadest sense the device of this invention may be considered a stress or torque indicator as well.

SUMMARY OF THE INVENTION

Briefly summarized, the strain indicator of this invention comprises a threaded bolt having a bore extending from the bolt head into the body. A pin member is received within the bore. The inner end of the pin member is fixed to the fastener by means of an adhesive. The free end of the pin member is received within an indicator assembly which itself is attached to the fastener. The indicator assembly is comprised of a body, an indicator element, a spring, and a release mechanism.

As the length of the threaded fastener is changed, the indicator element is caused to move with respect to the body of the indicator assembly thereby giving a visual indication of the fact that the fastener is being placed under stress.

If the elongation of the fastener is elastic, movement of the indicator element with respect to the body of the indicator assembly is approximately proportional to the degree of take-up of the fastener.

If, however, the elongation of the fastener exceeds the preset strain limit (i.e., the fastener is appropriately tightened) the indicator element will abut a stop surface of the body of the indicator assembly. Further movement of the pin member will result in activation of the release mechanism causing the indicator element to move to an extended position under the influence of the bias spring thus presenting a visual indication of the appropriate load take-up of the fastener.

BRIEF DESCRIPTION OF THE DRAWINGS

A more complete description of the invention will now be made with reference to the accompanying drawings in which.

DESCRIPTION OF THE PREFERRED EMBODIMENT

Figure 1:
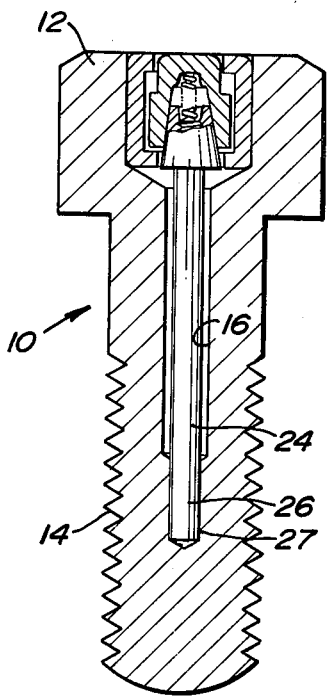
FIG. 1 is an elevational cross-sectional view of a fastener incorporating the indicating feature of this invention.

Turning now to FIG. 1, the apparatus of this invention includes fastener 10 having a head 12 and external threads 14. Head 12 may be in any desired configuration making it possible to turn the fastener with a suitable tool such as a wrench.

An axial bore 16 is drilled from the head of the fastener a substantial distance into the fastener body. A counterbore is provided at the head 12 in order to receive the indicator unit as will be described more fully hereafter.

As is shown in FIG. 1, pin member 24 is provided with a first end 26 adapted to be received within the bore 16. End 26 of pin member 24 is fastened to the wall defining bore 16 of the fastener by means of an adhesive 27 which is applied to either one or both of the surfaces of the pin member and the wall defining bore 16 prior to assembly. Alternate structures for securing the pin member 24 to the interior wall of the fastener 10 should be considered within the spirit of this invention including, but not limited to, screw threads or a press fit.

Figure 2:
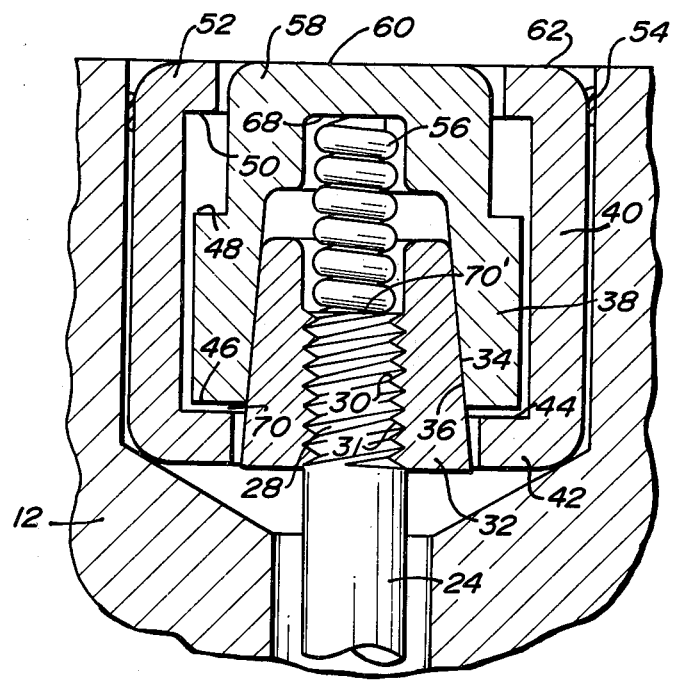
FIG. 2 is an enlarged fragmentary elevational cross-sectional view of the indicator portion of the apparatus of this invention with the fastener in an unstressed condition.

As is shown more clearly in FIG. 2, the second end of pin member 24 is provided with external threads 30 adapted to be received within complementary threads 31 of release element 32. An essentially frustoconical external surface 34 is defined by release element 32 and is received within a generally complementary essentially frustoconical interior surface 36 defined by indicator element 38. A coil spring 56 is received within indicator element 38 in a manner so as to rest against the upper portion 70' of pin member 24.

It should be understood that in the position shown in FIG. 2, coil spring 56 is in a state of compression and the surfaces 34, 36 are locked together.

Indicator element 38 is generally cup-shaped and includes, in addition to the internal frustoconical surface 36 described above, a pair of external generally radial stop shoulders 46, 48. The upper wall 58 of the indicator element is defined by an internal abutment surface 68 adapted to be engaged by coil spring 56 and an external generally planar surface 60.

In addition to the indicator element, release element and coil spring just described the indicator assembly of this invention includes a body 40 generally cylindrical in shape and including end walls 42, 52.

End wall 52 defines an internal generally radial shoulder 50. End wall 42 defines a generally radial internal shoulder 44.

The indicator assembly of this invention is retained within the head 12 of the fastener by means of adhesive 54 applied to either one or both of the surfaces of the body 40 and the wall defining the counterbore of the fastener 10.

In the position shown in FIG. 2 it will be noted that the surface 60 of indicator element 38 is substantially coplanar with surface 62 of body 40 and the external surface of head 12 of the fastener. The coplanar relationship of the surfaces 60 and 62, as shown in FIG. 2, is characteristic of the fastener in a nonstressed condition.

It will be noted from FIG. 2 that a clearance space 70 is defined between the stop shoulder 46 and shoulder 44 of body 40. Clearance 70 is closely controlled and is preestablished as a design function of the indicator in order that there may be established a visual indication of an appropriately torqued or stressed condition of the fastener as will be described below.

The fastener including the indicator assembly as shown in FIG. 2 is in condition for use.

OPERATION

The operation of the fastener of this invention will now be described with reference to FIGS. 2–4.

When the fastener is taken up and placed in the stressed condition, it will elongate causing the pin member 24 and the attached release element and indicator element to move with respect to body 40.

Thus, during take-up of the fastener, the members 32, 38 move in a downward direction with respect to FIG. 2. The amount of movement is essentially linear in proportion to the stress being applied to the fastener.

Figure 3:
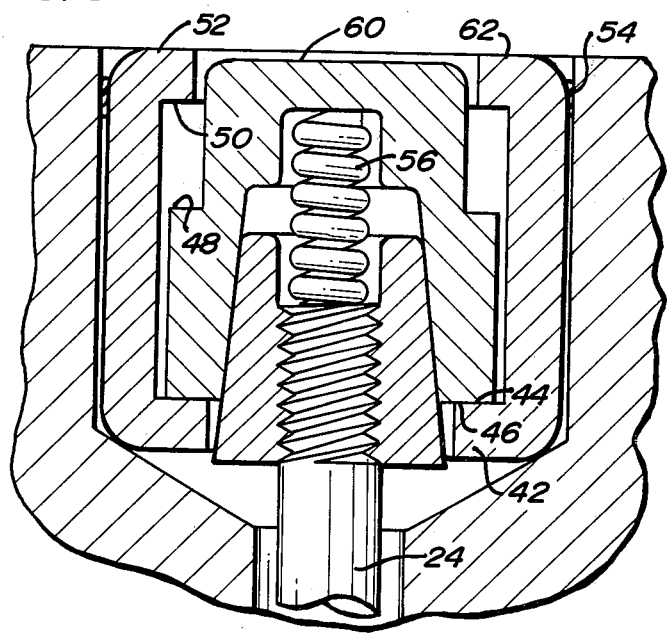
FIG. 3 is an enlarged fragmentary elevational cross-sectional view of the indicator portion of the apparatus of this invention with the fastener in a stressed condition within the elastic limit of the fastener material.

An elastic elongation of the fastener during take-up will produce a slight downward movement of the indicator element 38 as is shown in FIG. 3. The strain indicator of this invention is reversible and if the fastener should become loosened the indicator element will be caused to return to its original position as is shown in FIG. 2.

To review, in the condition shown in FIG. 3 the fastener has undergone elastic stretch as the downward movement of the indicator element 38 does not exceed the axial length of the clearance space 70. The clearance space 70 is premeasured (by means of shims or other measuring techniques well known to those skilled in the art) such that the axial or longitudinal dimension of the clearance space does not exceed the maximum design strain of the fastener material.

If, however, movement of indicator element 38 exceeds the axial length of clearance space 70, shoulders 44, 46 will be caused to abut. This condition of abutment is shown in FIG. 3. A further downward movement of the pin member 24 as shown in FIG. 3 will cause the release element 32 to be pulled from within the indicator element 38 with the result that the locking action created by the complementary tapered surfaces 34, 36 is released. Once released, the indicator element 38 is caused to move to an extended position as shown in FIG. 4 under the influence of the compressed coil spring 56. A limitation in the upward movement of the indicator element 38 as shown in FIG. 4 is imposed by the engaging shoulders 48, 50.

Figure 4:
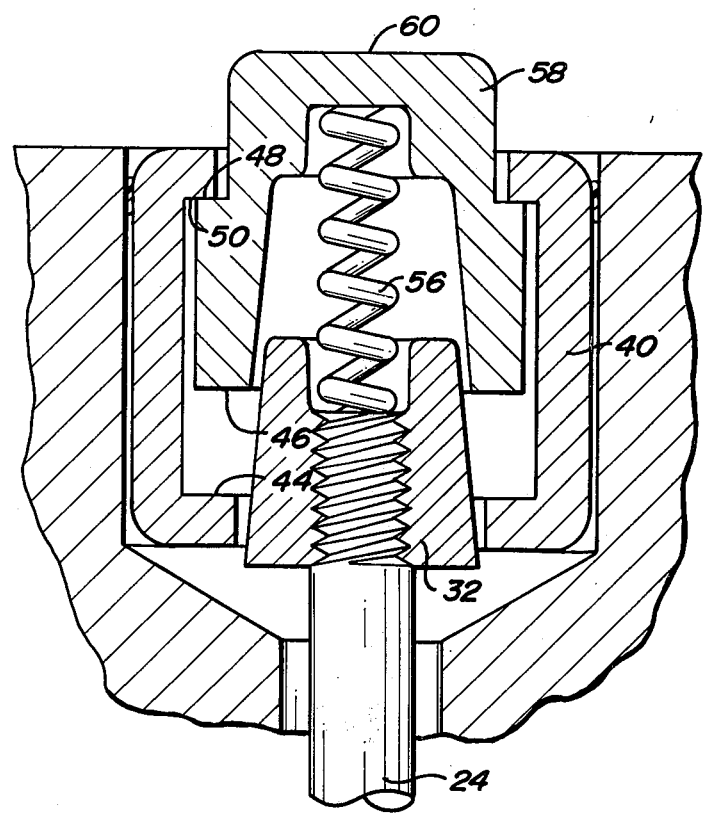
FIG. 4 is an enlarged fragmentary elevational cross-sectional view of the indicator portion of the apparatus of this invention with the fastener in a stressed condition, the elastic limit of the fastener material having been exceeded during take-up.

The indicator as shown in FIGS. 2–4 is capable of demonstrating several characteristics.

First of all the indicator provides a positive visual sign at such time as the preestablished bolt load has been exceeded as the indicator element will be caused to be released from the indicator assembly and projected into an extended position.

Secondly, the indicator can be reseated whenever load on the fastener becomes less than 90 percent of the design value, provided the fastener load has never exceeded elastic limits. This "press to test" feature becomes an indication that fastener design load is still in effect.

Further, if an excessive load is suspected to have caused permanent damage, the indicator can be used as a check by removing fastener load, then attempting to reseat the indicator. If it will not reseat the fastener has been loaded beyond its elastic limit and is unsafe.

The indicator of this invention can be assembled into virtually any type of strain member whether it be a bolt, rod or other machine element. Special fasteners and elements can readily be adapted to receive the indicator since it is basically a subassembly that can be joined to and made a part of any other unit.

It should be emphasized again that whereas the term strain indicator has been used throughout the description of this invention this phrase has been selected because a strain in a member produces movement of a pin member. Since strain, stress and torque are interrelated, the apparatus of this invention may well be termed a stress indicator or a torque indicator. The use of the term strain indicator, thus, should not be considered as limiting the invention.

While in the preferred embodiment adhesive has been used to join the body of the indicator assembly to the threaded fastener other means, known to those skilled in the art, should also be considered within the spirit of this invention.

Similarly, while the release element 32 is threadedly attached to the pin member 24 it should be understood that these members could be integral. Alternately, other attachment means for a two-piece structure could be utilized.

It should be noted that appropriate colors may be used to identify the external surface of the indicator element 38 in order to produce a clear visual indication of movement of such element with respect to the fastener. What is claimed is:

1. An optical stress-strain indicator comprising in combination:
   a first member subject to stress-strain and having a head and a recess extending from said head into said member;
   a second member received within said first member and having a first end and a second end, said first end being secured to said first member;
   a body member having a viewing area, said body member being secured to said first member with said viewing area substantially adjacent said head so as to be visible;

an indicator element disposed within said body member;

releasable connecting means interconnecting said indicator element and said second end of said second member;

bias means interposed between said indicator element and said second member, whereby:

a. as said first member undergoes an elastic change in length, said second end of said second member is caused to move with respect to said body with the result that said indicator element is caused to move inwardly with respect to said body, thereby giving a visual indication of the change of length of said first member;

b. as said first member undergoes a further change in length exceeding a preset limit of said first member, said indicator element becomes separated from said second member as said releasable connecting means is caused to release said indicator element from said second member and said bias means causes said indicator element to move to an extended position at least partially outside of said body member giving a visual indication of a load on said first member.

2. The invention of claim 1 in which said releasable connecting means is defined as interengaging, generally frustoconical surfaces, one surface defined at said indicator element and the other defined by a release element secured to said second member.

3. The invention of claim 1 in which said indicator element and said body are provided with generally radial stop shoulders with a clearance space initially provided between said shoulders.

4. The invention of claim 3 in which said clearance space has an axial dimension which approximates the strain limit of said first member.

5. The invention of claim 1 in which said indicator element and said body are provided with generally radial stop shoulders whereby travel of said indicator element outside of said body is limited.

* * * * *